April 1, 1941. J. H. BALTHIS, JR ET AL 2,236,966
SEPARATION OF ACETYLENE FROM GAS MIXTURES
Filed June 10, 1938
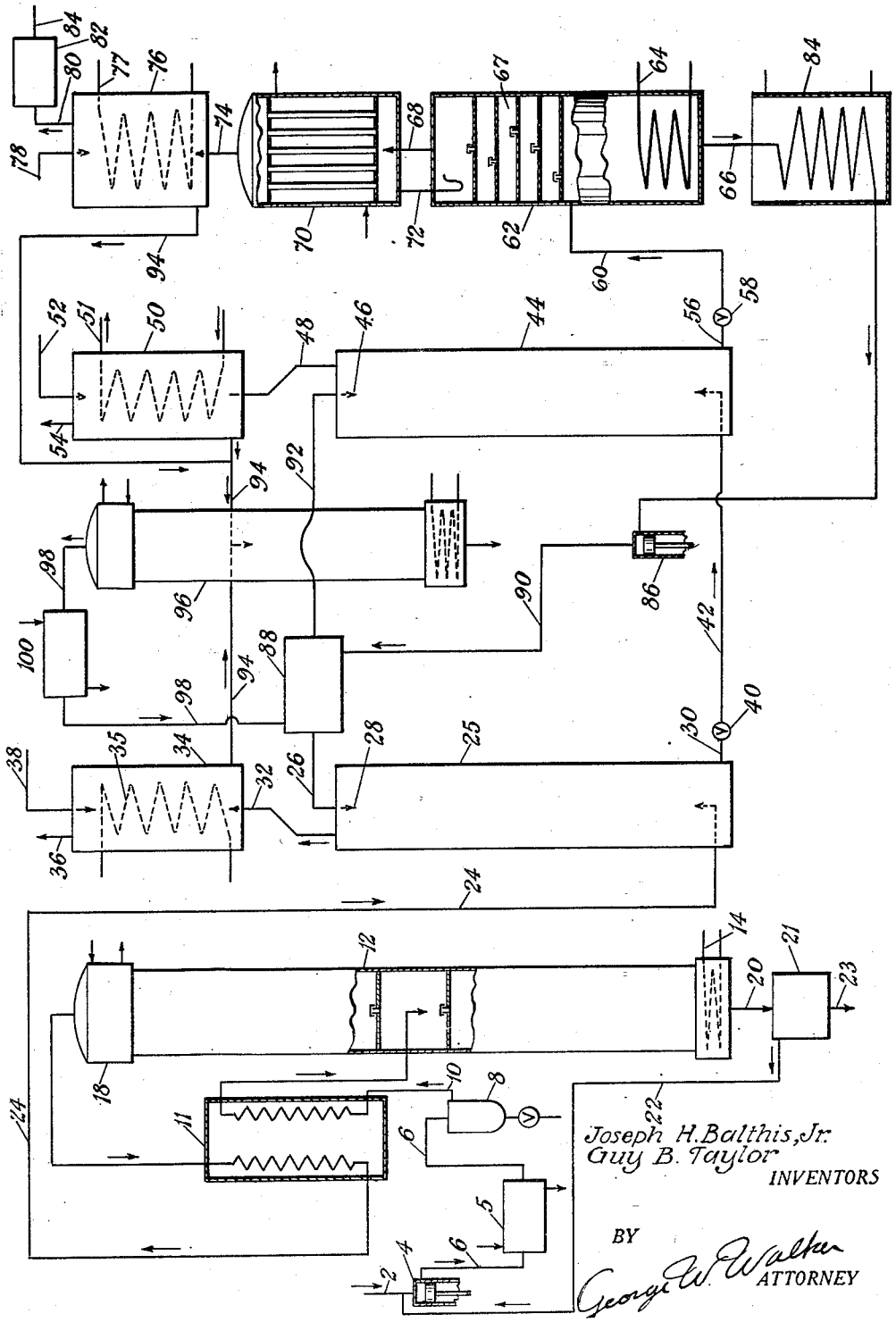
Joseph H. Balthis, Jr.
Guy B. Taylor
INVENTORS
BY George W. Walker
ATTORNEY Patented Apr. 1, 1941

2,236,966

UNITED STATES PATENT OFFICE 2,236,966

SEPARATION OF ACETYLENE FROM GAS MIXTURES

Joseph H. Balthis, Jr., and Guy B. Taylor, Wilmington, Del., assignors to E. I. du Pont de Nemours & Company, Wilmington, Del., a corporation of Delaware Application June 10, 1938, Serial No. 212,910

2 Claims. (Cl. 260—679)

This invention relates to the recovery of concentrated acetylene gas from admixture with other gases, and more particularly to the recovery from mixtures with other hydrocarbons boiling above and below acetylene and with hydrogen.

Until recently all acetylene was manufactured from calcium carbide but its use for chemical synthesis has created such a demand for acetylene that attempts have been made to obtain it from other sources. Most of these attempts have been in the field of high temperature cracking of gaseous or liquid hydrocarbons, usually by means of an electric arc. The gas produced by this cracking step consists chiefly of hydrogen and acetylene but contains in addition small quantities of other hydrocarbons boiling above and below acetylene. These hydrocarbons are mostly unsaturated and consist chiefly of ethylene, propylene, butylenes, methyl acetylene, and diacetylene. There are many known ways of partially removing the hydrocarbon impurities in order to concentrate the acetylene but no known process discloses a complete operation for the removal of all of these impurities and at the same time separating highly concentrated acetylene gas from the hydrogen.

This invention has as its object the recovery of concentrated acetylene gas from admixture with other gases. A further object is the production of concentrated acetylene gas by removing same from admixture with other hydrocarbons and hydrogen. A still further object is the recovery of acetylene from gaseous products obtained by cracking oils at temperatures such as are obtainable in the electric arc. A still further object is the separation of acetylene from hydrogen and higher boiling hydrocarbons, the acetylene being substantially pure except for any ethane that may be present. Other objects will appear hereinafter.

These objects are accomplished by the following invention which comprises rectifying the gaseous mixture under conditions which will cause the separation of those components less volatile than acetylene, then extracting the acetylene from the resulting gaseous fraction with a selective solvent; that is, a solvent that has a high selective solubility coefficient for acetylene, for example, acetone or diethyl oxalate. The solvent containing the dissolved acetylene is then treated so as to outgas the acetylene and recover same.

For the purpose of simplifying the terminology used herein and in the claims, the components more volatile than acetylene will be termed the "heads" and the components less volatile than acetylene will be termed the "tails."

The figure in the drawing is a diagrammatical illustration of one modification of an apparatus and process for carrying out the invention.

The following detailed description is given in order to illustrate the invention but is not to be considered as limiting said invention in any respect.

Referring to the drawing, crude gas generated by operating an electric arc submerged in oil was introduced into the system through conduit 2. The crude gas was compressed in compressor 4 to approximately 11 atmospheres absolute. The crude gas under pressure left the compressor 4 by way of conduit 6 and thence to cooler 5 and trap 8 where any condensed liquid contained therein was removed from admixture with the gas. The crude gas had the following composition:

|   | Per cent |
|---|---|
| Hydrogen | 52.7 |
| Methane | 6.0 |
| Ethylene | 6.0 |
| Acetylene | 28.0 |
| Propylene | 1.2 ⎫ |
| Methyl acetylene | 1.2 ⎪ |
| Butylenes | 1.2 ⎬ tails |
| Diacetylene | 2.5 ⎪ |
| Other hydrocarbons | 1.2 ⎭ |

The gas mixture then passed from trap 8 via conduit 10 through heat interchanger 11 where they are cooled and thence into the rectifying column 12. Here the mixture was rectified by heating the fluid mixture in the calandria 14 at the base of the column at a temperature of about +15° C. and by cooling in the condenser 18 at the top of the column to a temperature of about −60° C. Under these conditions the mixture boiling above acetylene and comprising propylene, methyl acetylene, butylenes, diacetylene, etc., was withdrawn as a liquid through conduit 20 at the base of the column and the remaining gases were drawn off from the top of the rectifying column as a gaseous fraction via conduit 24 and heat exchanger 11 and introduced into the bottom of scrubber 25. In order to avoid both polymerization and the explosion hazard, it is desired to heat the fluid in calandria 14 to between approximately +12° C. and +20° C. Under these conditions this liquid is only concentrated to about 75% tails and 25% acetylene. This acetylene loss which amounts to nearly 5% of the total produced is reduced to nearly zero by expanding the liquid to atmospheric pressure in tank 21, separating the flash gas from the liquid and recycling the gas via conduit 22 to the crude gas compressor 4. The "tails" are removed from tank 21 via conduit 23.

In scrubber 25 the gaseous fraction ascended against descending liquid acetone. The acetone scrubbed out and dissolved the acetylene contained in the gas. Acetone was introduced into the top of the scrubber through condit 26 and spray nozzle 28 and the acetone-acetylene solution was removed from the bottom of the scrubber via pipe 30. That fraction of gas not dissolved by the acetone was drawn off through conduit 32 from the top of the scrubber. As this fraction contained a considerable quantity of acetone vapors, these were removed by introducing the fraction into the water scrubber 34 where, due to the descending flow of water, acetone was dissolved from the gases. The permanent gases were removed from the system by way of conduit 36. Water was introduced into the water scrubber through conduit 38. The acetone-acetylene solution removed from the acetone scrubber 25 by way of conduit 30 passed through the expansion valve 40 where the pressure was reduced to approximately 2 atmospheres absolute and thence through conduit 42 into the lower part of the second acetone scrubber 44 where under the reduced pressure any gases less soluble in acetone than acetylene were outgassed from the acetylene-acetone solution and under the scrubbing action of additional acetone admitted through spray 46 were washed free of outgassed acetylene. The less soluble gaseous fraction was then removed from the acetone scrubber 44 by way of conduit 48. As this gaseous fraction contained acetone vapors, they were recovered in a manner similar to those recovered from the gaseous fraction drawn off from the top of acetone scrubber 25, the permanent gas fraction being scrubbed with water in water scrubber 50, which water was admitted into the top of the scrubber via conduit 52. The gaseous fraction freed of acetone was drawn off and out of the system by way of conduit 54. An alternative method of treating this gas fraction is to recycle it back to main compressor 4 to recover any acetylene contained therein. The water scrubbers 34 and 50 are cooled by means of cooling coils 35 and 51 in order to remove the heat of solution liberated when the acetone is dissolved in the water. The acetylene-acetone solution purified by outgassing any dissolved permanent gas was removed from the bottom of the acetone scrubber 44 via conduit 56 and thence through the expansion valve 58 where the pressure was reduced to atmospheric. From the expansion valve 58 it was introduced via conduit 60 into boiler 62. In the boiler 62 the acetone-acetylene solution was boiled by passing steam through coil 64. Under these conditions the acetylene was expelled from the acetone and pure acetone was removed from the bottom of the boiler by way of conduit 66. The acetylene gases containing acetone vapor passed through a rectifying section 67 located in the upper portion of the boiler and were admitted from the top of the boiler via conduit 68 into the backward return condenser 70 where reflux conditions were maintained and the condensed acetone returned to the boiler via conduit 72. From the backward return condenser 70 the acetylene gas saturated with acetone vapor was drawn off via conduit 74 into the water scrubber 76 cooled by cooling coil 77 where any acetone vapors contained therein were removed by the action of the descending flow of water. The water was admitted to the scrubber via conduit 78 and the acetylene freed from acetone was drawn off from the water scrubber via conduit 80 and thence through the drier 82 where water vapor was removed. Acetylene was emitted from the drier 82 through conduit 84. The liquid acetone freed from the acetylene which was removed from the bottom of boiler 62 via pipe 66 was cooled by the cooler 84 and thence passed to pump 86, which delivered the acetone to the acetone storage tank 88. From the storage tank 88 it was returned for recirculation as a scrubbing liquid via conduits 26 and 92 to the top of the acetone scrubber 25 and 44, respectively. The water-acetone solutions obtained in the water scrubbers 34, 50 and 76 were drawn off via branching conduit 94 and thence to the rectifying column 96 where the acetone was separated as a gas and the water as a liquid. The gaseous acetone was removed from the rectifying column 96 via conduit 98, thence through condenser 100, where it was converted to a liquid, and returned to the acetone storage tank 88. In this manner acetylene was obtained from admixture with gases boiling above and below acetylene. The acetylene is substantially pure except for a small amount of ethylene and methane.

As the drawing is purely diagrammatical, the equivalents of the various pieces of apparatus shown may be used; for example, the compressor 4 is shown as a single stage compressor. It is not intended that the process and apparatus be so limited. The figure in the drawing merely represents the function of compressing the gases. When the incoming gases are at atmospheric pressure and the pressure is to be increased to 11 atmospheres, a two or three-stage compressor is used with water coolers between each stage. Similar changes can be made in the other pieces of apparatus without departing from the spirit of the invention. Such changes are within the skill of those versed in the art.

The invention is not limited to the separation of a gaseous mixture of the composition disclosed. The invention is applicable to the separation of acetylene from any mixture of gases boiling above and below acetylene. The crude gas may be obtained from any source. The oil trap 8 may be omitted if the incoming gas does not contain high boiling constituents. Where the acetylene content of the gases are sufficient to cause an excess evolution of heat of absorption in the acetylene-acetone absorbers, cooling means should be provided for the removal of this heat.

The specific conditions of operation of the rectifying column for removing the gaseous fraction boiling above acetylene depend upon the pressure used in the system as well as upon the composition of the gaseous mixture. This rectifying column should be heated at the bottom at a temperature corresponding to the boiling point of the gas fraction boiling just below the acetylene and cooled at the top to a temperature low enough to pass practically all of the acetylene out of the column and to condense from the gas those components less volatile than acetylene. This cooling temperature may be as high as $-40°$ C. if the gas is relatively free of hydrogen and methane or may be as low as $-80°$ C. if the gas is high in these materials. The temperature of the boiler is maintained sufficiently high that the major portion of the acetylene is vaporized from the "tails" liquid but not so high that excessive polymerization of the higher acetylenes is obtained.

Solvents other than acetone may be used for scrubbing out the acetylene from the gas containing acetylene and lower boiling constituents. Any solvent having a high selective solubility coefficient for acetylene may be used. The scrubbing step is carried out at normal temperature; that is, at the temperature which the scrubber will naturally assume when standing in a building or a shed. The temperature of the liquid in the scrubber will vary of course with the concentration of acetylene in the solvent due to the heat of solution. Thus the solution containing dissolved acetylene in the scrubber may be several degrees above the atmospheric temperature. However, the temperature will seldom be as low as 0° C., and the scrubbing step might properly be considered as being operated at room temperature. It is also obvious that the scrubber may operate at any temperature within the range that it would naturally assume due to changes in atmospheric temperature. The water scrubbers and the acetylene recovery system including the rectifying column 96 may be dispensed with if the scrubbing solvent used is relatively non-volatile and inexpensive. The recovery system will of course depend upon the solvent used. The rectifying column 12 may be operated at any pressure up to about 35 atmospheres absolute but not higher than 45 atmospheres. It is preferred to operate at pressure between 50 and 250 lbs. per sq. in. gauge or 5 and 18 atmospheres absolute. The second acetone scrubber may be omitted if the gaseous constituents boiling below acetylene are such that they are not dissolved in the scrubbing solution. The scrubbing solution containing the acetylene gas may be outgassed in any manner such as by heating or reducing the pressure thereon, or both as shown in the preferred embodiment of the invention. The steps of scrubbing with water and drying the acetylene vapors may or may not be used, depending on the type of solvent selected.

This process is of especial advantage for the extraction of pure acetylene from a crude gas which is dilute in ethylene. The advantages of using a low temperature process for the removal of high boiling materials over an absorption method are:

A. The high boilers are recovered in a concentrated form without the application of temperatures higher than +15° to +20° C. This low temperature treatment retards the polymerization of the higher acetylenes which allows their recovery with a minimum of degradation and a minimum of hazard.

B. The loss of product acetylene with the high boilers is low, in many cases below 1%.

It is apparent that many widely different embodiments of this invention may be made without departing from the spirit and scope thereof and therefore it is not intended to be limited except as indicated in the appended claims.

We claim:

1. The process for the recovery of acetylene from admixture with components boiling above and below acetylene which comprises rectifying the mixture at a pressure between 50 and 250 lbs. per sq. in. gauge so as to separate acetylene and the lower boiling components as a gas and the higher boiling components as a liquid, said rectification being effected by boiling the liquid at the base of the rectifying column at a temperature which will expel the gaseous fraction containing acetylene and by cooling the gases at the top of the rectifying column at a temperature that will condense the higher boiling components contained therein so as to furnish reflux in said column, then scrubbing the resulting gas fraction with acetone at a temperature within the range known as room temperatures so as to selectively dissolve the acetylene from the more volatile components, reducing the pressure on the acetylene-acetone solution such a degree as to outgas the major portion of any components less soluble in acetone than acetylene, scrubbing these gases with acetone to remove acetylene, combining the acetylene-actone solution produced in the second scrubber with the acetylene-acetone solution resulting from said outgassing, further reducing the pressure on the combined acetylene-acetone solution to approximately atmospheric and boiling same under reflux conditions so as to outgas acetylene and recover the acetone, scrubbing the acetylene with water to remove acetone and drying said acetyplene to remove water vapor, thus recovering substantially pure acetylene.

2. The process for the recovery of acetylene from admixture with components boiling above and below the boiling point of acetylene, which comprises rectifying the mixture at a pressure of about 150 pounds per square inch gauge so as to separate acetylene and the lower boiling components as a gas and the higher boiling components as a liquid, said rectification being effected by boiling the liquid at the base of the rectifying column at a temperature of about +15° C. in order to expel the gaseous fraction and by condensing the reflux liquors at the top of the rectifying column at a temperature of about −60° C., then scrubbing the resulting gas fraction with acetone at a temperature within the range known as room temperatures so as to selectively dissolve the acetylene from the more volatile components, reducing the pressure on the acetylene-acetone solution to about two atmospheres so as to outgas the major portion of any components less soluble in acetone than acetylene which may be contained therein, scrubbing these gases with acetone to remove acetylene, combining the acetylene-acetone solution produced in the second scrubber with the acetylene-acetone solution resulting from said outgassing further reducing the pressure on the combined acetylene-acetone solution to atmospheric and boiling same under reflux conditions so as to outgas acetylene and remover the acetone, scrubbing the acetylene with water to remove traces of acetone and drying same to remove water vapor, thus recovering acetylene substantially pure except for a small amount of ethylene and methane, scrubbing the gaseous components more volatile than acetylene separated in the first acetone scrubbing step and the gaseous components more volatile than acetylene separated in the second acetone scrubbing step with water so as to remove the acetone contained therein, combining this acetone and water solution with the solution from the water scrubbing of the acetone containing acetylene gases and fractionating same so as to separate the acetone from the water, cooling the acetone to liquefy same and returning it to the system for recycling, cooling the acetone separated in the refluxing of the acetylene-acetone solution and returning same to the system for reuse.

JOSEPH H. BALTHIS, JR.
GUY B. TAYLOR.

CERTIFICATE OF CORRECTION.

Patent No. 2,236,966. April 1, 1941.

JOSEPH H. BALTHIS, JR., ET AL.

It is hereby certified that error appears in the printed specification of the above numbered patent requiring correction as follows: Page 3, second column, line 9, claim 1, for "acetylene-actone" read --acetylene-acetone--; line 17-18, same claim, for "acetplene" read --acetylene--; line 49, claim 2, for the word "remover" read --recover--; and that the said Letters Patent should be read with this correction therein that the same may conform to the record of the case in the Patent Office.

Signed and sealed this 6th day of May, A. D. 1941.

(Seal)

Henry Van Arsdale,
Acting Commissioner of Patents.